(12) United States Patent
Iyer et al.

(10) Patent No.: US 12,107,821 B2
(45) Date of Patent: Oct. 1, 2024

(54) TWO TIER DNS

(71) Applicant: VMware LLC, Palo Alto, CA (US)

(72) Inventors: Sreeram Iyer, Bengaluru (IN); Murali Basavaiah, Los Altos, CA (US); Prasad Rao, Bengaluru (IN); Shyam Prasad Anisetti, Bengaluru (IN); Naveen Dhillon, Bengaluru (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/211,552

(22) Filed: Jun. 19, 2023

(65) Prior Publication Data

US 2024/0022538 A1    Jan. 18, 2024

(30) Foreign Application Priority Data

Jul. 14, 2022   (IN) .............................. 202241040393

(51) Int. Cl.
*H04L 61/4511*    (2022.01)
*H04L 61/5007*    (2022.01)

(52) U.S. Cl.
CPC ...... *H04L 61/4511* (2022.05); *H04L 61/5007* (2022.05)

(58) Field of Classification Search
CPC .......................... H04L 61/4511; H04L 61/5007
(Continued)

(56) References Cited

U.S. PATENT DOCUMENTS

RE4,814 E    3/1872  Madurell
5,109,486 A   4/1992  Seymour
(Continued)

FOREIGN PATENT DOCUMENTS

AU    2011352884 A1    7/2013
CA    2607005 C    2/2012
(Continued)

OTHER PUBLICATIONS

Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.

(Continued)

*Primary Examiner* — David P Zarka
(74) *Attorney, Agent, or Firm* — Quarles & Brady LLP

(57) ABSTRACT

Some embodiments provide a two-tier DNS (Domain Name System) service for processing DNS requests. In some embodiments, the two-tier DNS service deploys first and second tiers of service machines, with the second-tier having several groups of service machines each of which is configured to resolve DNS requests for a different set of domain names than the other second-tier group(s). Each service machine in the first-tier is configured to identify the second-tier group responsible for each particular DNS request that the service machine receives for each particular domain name, and to forward the particular DNS request to the second-tier group that it identifies for the particular DNS request. The first-tier DNS service in some embodiments has only one group of service machines. Each first or second service machine group in some embodiments can have one or more service machines, and can be scaled up or down to add or remove service machines to the group (e.g., through an active/active layer 3 scaleout with BGP). In some embodiments, two different second-tier service groups can process DNS requests for two or more different FQDNs (fully qualified domain names) that are part of the same domain, and/or for two or more different FQDNs that are part of different domains.

18 Claims, 9 Drawing Sheets

(58) Field of Classification Search
USPC .................................................. 709/245
See application file for complete search history.

(56) References Cited

U.S. PATENT DOCUMENTS

| | | | |
|---|---|---|---|
| 5,781,703 | A | 7/1998 | Desai et al. |
| 6,148,335 | A | 11/2000 | Haggard et al. |
| 6,449,739 | B1 | 9/2002 | Landan |
| 6,515,968 | B1 | 2/2003 | Combar et al. |
| 6,714,979 | B1 | 3/2004 | Brandt et al. |
| 6,754,706 | B1 | 6/2004 | Swildens et al. |
| 6,792,458 | B1 | 9/2004 | Muret et al. |
| 6,792,460 | B2 | 9/2004 | Oulu et al. |
| 6,901,051 | B1 | 5/2005 | Hou et al. |
| 6,976,090 | B2 | 12/2005 | Ben-Shaul et al. |
| 6,996,778 | B2 | 2/2006 | Rajarajan et al. |
| 7,076,695 | B2 | 7/2006 | McGee et al. |
| 7,130,812 | B1 | 10/2006 | Iyer et al. |
| 7,228,359 | B1 * | 6/2007 | Monteiro ............ H04L 67/289 709/228 |
| 7,246,159 | B2 | 7/2007 | Aggarwal et al. |
| 7,353,272 | B2 | 4/2008 | Robertson et al. |
| 7,430,610 | B2 | 9/2008 | Pace et al. |
| 7,636,708 | B2 | 12/2009 | Garcea et al. |
| 7,701,852 | B1 | 4/2010 | Hohn et al. |
| 7,743,380 | B2 | 6/2010 | Seidman et al. |
| 7,933,988 | B2 | 4/2011 | Nasuto et al. |
| 7,990,847 | B1 | 8/2011 | Leroy et al. |
| 8,032,896 | B1 | 10/2011 | Li et al. |
| 8,112,471 | B2 | 2/2012 | Wei et al. |
| 8,131,712 | B1 | 3/2012 | Thambidorai et al. |
| 8,412,493 | B2 | 4/2013 | Duchenay et al. |
| 8,499,066 | B1 | 7/2013 | Zhang et al. |
| 8,588,069 | B2 | 11/2013 | Todd et al. |
| 8,856,797 | B1 | 10/2014 | Siddiqui et al. |
| 8,874,725 | B1 | 10/2014 | Ganjam et al. |
| 8,977,728 | B1 | 3/2015 | Martini |
| 9,032,078 | B2 | 5/2015 | Beerse et al. |
| 9,047,648 | B1 | 6/2015 | Lekutai et al. |
| 9,071,537 | B2 | 6/2015 | Talla et al. |
| 9,083,710 | B1 | 7/2015 | Yadav |
| 9,210,056 | B1 | 12/2015 | Choudhary et al. |
| 9,256,452 | B1 | 2/2016 | Suryanarayanan et al. |
| 9,258,270 | B2 * | 2/2016 | Smith ................ H04L 61/4511 |
| 9,288,193 | B1 | 3/2016 | Gryb et al. |
| 9,300,552 | B2 | 3/2016 | Dube et al. |
| 9,300,553 | B2 | 3/2016 | Dube et al. |
| 9,319,343 | B2 | 4/2016 | Khandelwal et al. |
| 9,329,915 | B1 | 5/2016 | Chandrasekharapuram et al. |
| 9,450,700 | B1 | 9/2016 | Tonder et al. |
| 9,459,980 | B1 | 10/2016 | Arguelles |
| 9,467,476 | B1 | 10/2016 | Shieh et al. |
| 9,477,784 | B1 | 10/2016 | Bhave et al. |
| 9,483,286 | B2 | 11/2016 | Basavaiah et al. |
| 9,491,164 | B1 | 11/2016 | Fay et al. |
| 9,495,222 | B1 | 11/2016 | Jackson |
| 9,531,614 | B1 | 12/2016 | Nataraj et al. |
| 9,535,805 | B2 | 1/2017 | Ananthanarayanan et al. |
| 9,558,465 | B1 | 1/2017 | Arguelles et al. |
| 9,571,516 | B1 | 2/2017 | Curcic et al. |
| 9,608,880 | B1 | 3/2017 | Goodall |
| 9,613,120 | B1 | 4/2017 | Kharatishvili et al. |
| 9,626,275 | B1 | 4/2017 | Hitchcock et al. |
| 9,674,302 | B1 | 6/2017 | Khalid et al. |
| 9,680,699 | B2 | 6/2017 | Cohen et al. |
| 9,692,811 | B1 | 6/2017 | Tajuddin et al. |
| 9,697,316 | B1 | 7/2017 | Taylor et al. |
| 9,712,410 | B1 | 7/2017 | Char et al. |
| 9,716,617 | B1 | 7/2017 | Ahuja et al. |
| 9,729,414 | B1 | 8/2017 | Oliveira et al. |
| 9,749,888 | B1 | 8/2017 | Colwell et al. |
| 9,798,883 | B1 | 10/2017 | Gil et al. |
| 9,817,699 | B2 | 11/2017 | Stich et al. |
| 9,830,192 | B1 | 11/2017 | Crouchman et al. |
| 9,882,830 | B2 | 1/2018 | Taylor et al. |
| 9,935,829 | B1 | 4/2018 | Miller et al. |
| 9,959,188 | B1 | 5/2018 | Krishnan |
| 9,967,275 | B1 | 5/2018 | Kolman et al. |
| 9,979,617 | B1 | 5/2018 | Meyer et al. |
| 10,003,550 | B1 | 6/2018 | Babcock et al. |
| 10,015,094 | B1 | 7/2018 | Akers et al. |
| 10,127,097 | B2 | 11/2018 | Talla et al. |
| 10,148,631 | B1 | 12/2018 | Sokolov et al. |
| 10,212,041 | B1 | 2/2019 | Rastogi et al. |
| 10,237,135 | B1 | 3/2019 | Alabsi et al. |
| 10,313,211 | B1 | 6/2019 | Rastogi et al. |
| 10,372,600 | B2 | 8/2019 | Mathur |
| 10,547,521 | B1 | 1/2020 | Roy et al. |
| 10,594,562 | B1 | 3/2020 | Rastogi et al. |
| 10,630,543 | B1 | 4/2020 | Wei et al. |
| 10,693,734 | B2 | 6/2020 | Rastogi et al. |
| 10,728,121 | B1 | 7/2020 | Chitalia et al. |
| 10,873,541 | B2 | 12/2020 | Callau et al. |
| 10,931,548 | B1 | 2/2021 | Iyer et al. |
| 10,999,168 | B1 | 5/2021 | Gupta et al. |
| 11,038,839 | B1 | 6/2021 | Vettaikaran et al. |
| 11,038,840 | B1 | 6/2021 | Vettaikaran et al. |
| 11,044,180 | B2 | 6/2021 | Rastogi et al. |
| 11,122,004 | B1 * | 9/2021 | Kaczmarek ........... H04L 61/106 |
| 11,171,849 | B2 | 11/2021 | Rastogi et al. |
| 11,283,697 | B1 | 3/2022 | Rajagopalan et al. |
| 11,290,358 | B2 | 3/2022 | Basavaiah et al. |
| 11,411,825 | B2 | 8/2022 | Rastogi et al. |
| 11,513,844 | B1 | 11/2022 | Aleti et al. |
| 11,582,120 | B2 | 2/2023 | Basavaiah et al. |
| 11,736,372 | B2 | 8/2023 | Rastogi et al. |
| 2002/0078150 | A1 | 6/2002 | Thompson et al. |
| 2002/0198984 | A1 | 12/2002 | Goldstein et al. |
| 2002/0198985 | A1 | 12/2002 | Fraenkel et al. |
| 2003/0007482 | A1 * | 1/2003 | Khello ................ H04L 61/4557 370/328 |
| 2003/0191837 | A1 | 10/2003 | Chen |
| 2003/0236877 | A1 | 12/2003 | Allan |
| 2004/0054680 | A1 | 3/2004 | Kelley et al. |
| 2004/0064552 | A1 | 4/2004 | Chong et al. |
| 2004/0095962 | A1 * | 5/2004 | Ohta ................... H04L 61/4511 370/389 |
| 2004/0103186 | A1 | 5/2004 | Casati et al. |
| 2004/0143637 | A1 | 7/2004 | Koning et al. |
| 2004/0243607 | A1 | 12/2004 | Tummalapalli |
| 2005/0010578 | A1 | 1/2005 | Doshi |
| 2005/0039104 | A1 | 2/2005 | Shah et al. |
| 2005/0060574 | A1 | 3/2005 | Klotz et al. |
| 2005/0108444 | A1 | 5/2005 | Flauaus et al. |
| 2005/0120160 | A1 | 6/2005 | Plouffe et al. |
| 2005/0172018 | A1 | 8/2005 | Devine et al. |
| 2005/0188221 | A1 | 8/2005 | Motsinger et al. |
| 2006/0167939 | A1 | 7/2006 | Seidman et al. |
| 2006/0224725 | A1 | 10/2006 | Bali et al. |
| 2006/0242282 | A1 | 10/2006 | Mullarkey |
| 2006/0271677 | A1 | 11/2006 | Mercier |
| 2007/0136331 | A1 | 6/2007 | Hasan et al. |
| 2007/0226554 | A1 | 9/2007 | Greaves et al. |
| 2008/0104230 | A1 | 5/2008 | Nasuto et al. |
| 2008/0126534 | A1 | 5/2008 | Mueller et al. |
| 2008/0183876 | A1 | 7/2008 | Duvur et al. |
| 2009/0049524 | A1 | 2/2009 | Farrell et al. |
| 2009/0154366 | A1 | 6/2009 | Rossi |
| 2009/0199196 | A1 | 8/2009 | Peracha |
| 2010/0030915 | A1 | 2/2010 | Kiefer et al. |
| 2010/0077462 | A1 | 3/2010 | Joffe et al. |
| 2010/0208742 | A1 | 8/2010 | Kafle et al. |
| 2010/0279622 | A1 | 11/2010 | Shuman et al. |
| 2010/0287171 | A1 | 11/2010 | Schneider |
| 2010/0293296 | A1 | 11/2010 | Hsu et al. |
| 2011/0126111 | A1 | 5/2011 | Gill et al. |
| 2011/0196890 | A1 | 8/2011 | Pfeifle et al. |
| 2012/0101800 | A1 | 4/2012 | Miao et al. |
| 2012/0110185 | A1 | 5/2012 | Ganesan et al. |
| 2012/0131591 | A1 | 5/2012 | Moorthi et al. |
| 2012/0254443 | A1 | 10/2012 | Ueda |
| 2012/0254444 | A1 | 10/2012 | Harchol-Balter et al. |
| 2012/0291099 | A1 | 11/2012 | Grube et al. |
| 2013/0013953 | A1 | 1/2013 | Eck et al. |

(56) References Cited

U.S. PATENT DOCUMENTS

| | | | |
|---|---|---|---|
| 2013/0054789 A1* | 2/2013 | Bajamahal | H04L 45/04 709/224 |
| 2013/0086230 A1 | 4/2013 | Guerra et al. | |
| 2013/0086273 A1 | 4/2013 | Wray et al. | |
| 2013/0151853 A1 | 6/2013 | Azzouz et al. | |
| 2013/0179289 A1 | 7/2013 | Calder et al. | |
| 2013/0179881 A1 | 7/2013 | Calder et al. | |
| 2013/0179894 A1 | 7/2013 | Calder et al. | |
| 2013/0179895 A1 | 7/2013 | Calder et al. | |
| 2013/0211559 A1 | 8/2013 | Lawson et al. | |
| 2013/0212257 A1 | 8/2013 | Murase et al. | |
| 2013/0290538 A1 | 10/2013 | Gmach et al. | |
| 2013/0326044 A1 | 12/2013 | Maldaner | |
| 2013/0326623 A1 | 12/2013 | Kruglick | |
| 2013/0343213 A1 | 12/2013 | Reynolds et al. | |
| 2013/0346594 A1 | 12/2013 | Banerjee et al. | |
| 2014/0006862 A1 | 1/2014 | Jain et al. | |
| 2014/0032785 A1 | 1/2014 | Chaudhuri et al. | |
| 2014/0059179 A1 | 2/2014 | Lam | |
| 2014/0101226 A1 | 4/2014 | Khandekar et al. | |
| 2014/0122725 A1 | 5/2014 | Batrouni et al. | |
| 2014/0143406 A1 | 5/2014 | Malhotra et al. | |
| 2014/0173675 A1 | 6/2014 | Ahmed et al. | |
| 2014/0215058 A1 | 7/2014 | Vicat-Blanc et al. | |
| 2014/0215621 A1 | 7/2014 | Xaypanya et al. | |
| 2014/0229706 A1 | 8/2014 | Kuesel et al. | |
| 2014/0280886 A1 | 9/2014 | Burns | |
| 2014/0282160 A1 | 9/2014 | Zarpas | |
| 2014/0304414 A1 | 10/2014 | Yengalasetti et al. | |
| 2014/0344439 A1 | 11/2014 | Kempf et al. | |
| 2014/0351226 A1 | 11/2014 | Christodorescu et al. | |
| 2014/0373140 A1 | 12/2014 | Waters, Jr. et al. | |
| 2015/0058265 A1 | 2/2015 | Padala et al. | |
| 2015/0074679 A1 | 3/2015 | Fenoglio et al. | |
| 2015/0081880 A1 | 3/2015 | Eaton et al. | |
| 2015/0106325 A1 | 4/2015 | Cole et al. | |
| 2015/0106523 A1 | 4/2015 | Cui et al. | |
| 2015/0124640 A1 | 5/2015 | Chu et al. | |
| 2015/0134831 A1 | 5/2015 | Hiroishi | |
| 2015/0199219 A1 | 7/2015 | Kim et al. | |
| 2015/0212829 A1 | 7/2015 | Kupershtok et al. | |
| 2015/0244626 A1 | 8/2015 | Childress et al. | |
| 2015/0278061 A1 | 10/2015 | Siciliano et al. | |
| 2015/0288682 A1 | 10/2015 | Bisroev et al. | |
| 2015/0293954 A1 | 10/2015 | Hsiao et al. | |
| 2015/0295780 A1 | 10/2015 | Hsiao et al. | |
| 2015/0295796 A1 | 10/2015 | Hsiao et al. | |
| 2015/0358391 A1 | 12/2015 | Moon et al. | |
| 2015/0370852 A1 | 12/2015 | Shastry et al. | |
| 2015/0381558 A1 | 12/2015 | Tuliani | |
| 2016/0036837 A1 | 2/2016 | Jain et al. | |
| 2016/0064277 A1 | 3/2016 | Park et al. | |
| 2016/0065609 A1 | 3/2016 | Yan | |
| 2016/0087879 A1 | 3/2016 | Matsubara et al. | |
| 2016/0094401 A1 | 3/2016 | Anwar et al. | |
| 2016/0094410 A1 | 3/2016 | Anwar et al. | |
| 2016/0094431 A1 | 3/2016 | Hall et al. | |
| 2016/0094483 A1 | 3/2016 | Johnston et al. | |
| 2016/0103717 A1 | 4/2016 | Dettori et al. | |
| 2016/0105335 A1 | 4/2016 | Choudhary et al. | |
| 2016/0125330 A1 | 5/2016 | Borah | |
| 2016/0127204 A1 | 5/2016 | Ozaki et al. | |
| 2016/0149832 A1 | 5/2016 | Liang et al. | |
| 2016/0162701 A1 | 6/2016 | Rosenberg et al. | |
| 2016/0164738 A1 | 6/2016 | Pinski et al. | |
| 2016/0182399 A1 | 6/2016 | Zadka et al. | |
| 2016/0217022 A1 | 7/2016 | Velipasaoglu et al. | |
| 2016/0294701 A1 | 10/2016 | Batrouni et al. | |
| 2016/0294722 A1 | 10/2016 | Bhatia et al. | |
| 2016/0315857 A1* | 10/2016 | Lubashev | H04L 12/6418 |
| 2016/0323197 A1 | 11/2016 | Guzman et al. | |
| 2016/0323377 A1 | 11/2016 | Einkauf et al. | |
| 2016/0359719 A1 | 12/2016 | Travostino | |
| 2016/0378635 A1 | 12/2016 | Taylor et al. | |
| 2017/0041386 A1 | 2/2017 | Bhat et al. | |
| 2017/0063933 A1 | 3/2017 | Shieh et al. | |
| 2017/0093986 A1 | 3/2017 | Kim et al. | |
| 2017/0126792 A1 | 5/2017 | Halpern et al. | |
| 2017/0134481 A1 | 5/2017 | DeCusatis et al. | |
| 2017/0195090 A1 | 7/2017 | Boidol et al. | |
| 2017/0295207 A1 | 10/2017 | Yu et al. | |
| 2017/0324555 A1 | 11/2017 | Wu et al. | |
| 2017/0331907 A1 | 11/2017 | Jagannath et al. | |
| 2017/0344618 A1 | 11/2017 | Horowitz et al. | |
| 2018/0004582 A1 | 1/2018 | Hallenstål | |
| 2018/0007126 A1 | 1/2018 | Borst et al. | |
| 2018/0018244 A1 | 1/2018 | Yoshimura et al. | |
| 2018/0041408 A1 | 2/2018 | Dagum et al. | |
| 2018/0041470 A1 | 2/2018 | Schultz et al. | |
| 2018/0046482 A1 | 2/2018 | Karve et al. | |
| 2018/0063193 A1 | 3/2018 | Chandrashekhar et al. | |
| 2018/0088935 A1 | 3/2018 | Church et al. | |
| 2018/0089328 A1 | 3/2018 | Bath et al. | |
| 2018/0136931 A1 | 5/2018 | Hendrich et al. | |
| 2018/0239651 A1 | 8/2018 | Gong et al. | |
| 2018/0287902 A1 | 10/2018 | Chitalia et al. | |
| 2018/0302375 A1 | 10/2018 | Els | |
| 2018/0309637 A1 | 10/2018 | Gill et al. | |
| 2018/0335946 A1 | 11/2018 | Wu et al. | |
| 2018/0367596 A1 | 12/2018 | Bache et al. | |
| 2019/0014102 A1 | 1/2019 | Mathew et al. | |
| 2019/0121672 A1 | 4/2019 | Ding et al. | |
| 2019/0123970 A1 | 4/2019 | Rastogi et al. | |
| 2019/0199790 A1 | 6/2019 | Yang et al. | |
| 2019/0238505 A1 | 8/2019 | Richards et al. | |
| 2019/0297014 A1 | 9/2019 | Azgin et al. | |
| 2020/0014594 A1 | 1/2020 | Lapiotis et al. | |
| 2020/0136939 A1 | 4/2020 | Rastogi et al. | |
| 2020/0136942 A1 | 4/2020 | Rastogi et al. | |
| 2020/0142788 A1 | 5/2020 | Hu et al. | |
| 2020/0169479 A1 | 5/2020 | Ireland | |
| 2020/0169528 A1* | 5/2020 | Le | H04W 4/70 |
| 2020/0218571 A1 | 7/2020 | Chen | |
| 2020/0287794 A1 | 9/2020 | Rastogi et al. | |
| 2020/0374039 A1 | 11/2020 | Rau et al. | |
| 2020/0382390 A1 | 12/2020 | Basavaiah et al. | |
| 2020/0382584 A1* | 12/2020 | Basavaiah | H04L 43/10 |
| 2021/0058453 A1 | 2/2021 | Balasubramanian et al. | |
| 2021/0099429 A1* | 4/2021 | Landriot | H04L 63/0263 |
| 2021/0119923 A1 | 4/2021 | Brown et al. | |
| 2021/0349749 A1 | 11/2021 | Guha | |
| 2021/0373971 A1 | 12/2021 | Lu et al. | |
| 2022/0141102 A1 | 5/2022 | Rastogi et al. | |
| 2022/0147390 A1 | 5/2022 | Akinapelli et al. | |
| 2022/0231949 A1 | 7/2022 | Ramaswamy et al. | |
| 2022/0237203 A1 | 7/2022 | Das et al. | |
| 2022/0286373 A1 | 9/2022 | Rajagopalan et al. | |
| 2022/0353201 A1 | 11/2022 | Navali et al. | |
| 2022/0368758 A1 | 11/2022 | Suri et al. | |
| 2022/0400097 A1 | 12/2022 | Rao et al. | |
| 2022/0400098 A1 | 12/2022 | Rao et al. | |
| 2023/0018908 A1 | 1/2023 | Yue et al. | |
| 2023/0024475 A1 | 1/2023 | Mandeyam et al. | |
| 2023/0025679 A1 | 1/2023 | Mandeyam et al. | |
| 2023/0052818 A1 | 2/2023 | Jain et al. | |
| 2023/0171171 A1 | 6/2023 | Basavaiah et al. | |

FOREIGN PATENT DOCUMENTS

| | | |
|---|---|---|
| EP | 4239484 A2 | 9/2023 |
| WO | 2020086956 A1 | 4/2020 |

OTHER PUBLICATIONS

Author Unknown, "Autoscaling," Aug. 20, 2015, 4 pages, Amazon Web Services, retrieved from http://web.archive.org/web/20150820193921/https://aws.amazon.com/autoscaling/.

Author Unknown, "BPF, eBPF, XDP and Bpfilter . . . What are These Things and What do They Mean for the Enterprise?," Apr. 16, 2018, 11 pages, Netronome, retrieved from https://www.netronome.com/blog/bpf-ebpf-xdp-and-opfilter-what-are-these-things-and-what-do-they-mean-enterprise/.

(56) References Cited

OTHER PUBLICATIONS

Catania, V., et al., "PMT: A Tool to Monitor Performances in Distributed Systems," Proceedings of the 3rd IEEE International Symposium on High Performance Distributed Computing, Aug. 2-5, 1994, 8 pages, San Francisco, CA, USA.

Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.

De George, Andy, "How to Scale an Application," Jun. 16, 2015, 8 pages, Github.com.

Liu, Feng, et al., "Monitoring of Grid Performance Based-on Agent," 2007 2nd International Conference on Pervasive Computing and Applications, Jul. 26-27, 2007, 6 pages, IEEE, Birmingham, UK.

Non-Published Commonly Owned Related U.S. Appl. No. 18/211,553 with similar specification, filed Jun. 19, 2023, 38 pages, VMware, Inc.

Non-Published Commonly Owned Related U.S. Appl. No. 18/211,555 with similar specification, filed Jun. 19, 2023, 37 pages, VMware, Inc.

Sevcik, Peter, et al., "Apdex Alliance," May 24, 2014, 5 pages, www.apdex.org.

Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.

Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.

Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

\* cited by examiner

TWO TIER DNS

BACKGROUND

Domain Name System (DNS) service is commonly used today to identify IP addresses associated with domain names. A typical approach to providing DNS service is to distribute all records to all DNS servers, making each server consume a lot of computation and memory resources. Some also provide different DNS service end points (public IP address or DNS names) for the name server records. Existing solutions also typically provide one IP address for the DNS server, and then provide more IP addresses when it is necessary to scale up the DNS service.

BRIEF SUMMARY

Some embodiments provide a two-tier DNS (Domain Name System) service for processing DNS requests. In some embodiments, the two-tier DNS service deploys first and second tiers of service machines, with the second-tier having several groups of service machines each of which is configured to resolve DNS requests for a different set of domain names than the other second-tier group(s). Each service machine in the first-tier is configured to identify the second-tier group responsible for each particular DNS request that the service machine receives for each particular domain name, and to forward the particular DNS request to the second-tier group that it identifies for the particular DNS request. The first-tier DNS service in some embodiments has only one group of service machines.

Each first or second service machine group in some embodiments can have one or more service machines, and can be scaled up or down to add or remove service machines to the group (e.g., through an active/active layer 3 scaleout with BGP). In some embodiments, two different second-tier service groups can process DNS requests for two or more different FQDNs (fully qualified domain names) that are part of the same domain, and/or for two or more different FQDNs that are part of different domains. Also, in some embodiments, one second-tier service group can be dedicated to one FQDN.

Each second-tier group in some embodiments processes DNS requests for a different subset of domain names. As such, each second-tier group serves as a smaller failure domain for only the subset of domain names that it processes. Each second-tier group provides a virtual DNS service that processes the DNS requests for a subset of domain names, and that is addressable through a different virtual IP (Internet Protocol) address than the virtual IP (VIP) address of other second-tier groups. In some embodiments, the first-tier service machines forward each particular DNS request to the identified second-tier group by addressing the particular DNS request to a particular VIP address of the identified second-tier group.

Also, in some embodiments, each DNS request is received at each first-tier service machine addressed to a first VIP address of the first-tier group that is different than the VIP addresses used by the second-tier groups. The first VIP address in some embodiments is an anycast VIP address, which is an IP address used by several different groups of first-tier service machines in several different geographic sites (e.g., several different buildings, cities, counties, states, countries, etc.). These different geographic sites are referred to below as Points of Presence (POPs), with each POP being one geographic site and having one group of first-tier service machines and one or more groups of second-tier service machines. The POPs are part of one wide-area network (WAN) in some embodiments.

In some embodiments, the POPs have gateway routers that advertise the anycast VIP address of the first-tier groups to external routers of external network(s) (e.g., to the Internet). Each external router outside of the POP networks (e.g., outside of the POP LANs or POP WAN) forwards each DNS request that it receives to a first-tier group of one of the POPs. For instance, for each DNS request, each external router in some embodiments identifies a next-hop interface that is associated with a first-tier group of one of the POPs, and forwards the DNS request to the identified interface so that it can eventually be forwarded to the associated first-tier group. When an external router uses a BGP routing protocol, the next-hop interface is the interface associated with the "closest" first-tier group (e.g., the first-tier group within the fewest hops to the external router).

The VIP address of each second-tier group in some embodiments is a private VIP address defined within the internal network of each POP (e.g., within the LAN of each POP or within the POP WAN). This private VIP address is not directly accessible to external machines operating in networks outside of POP network(s) (e.g., POP LANs or WAN). This is in contrast to the first VIP address of the first-tier service machines, which is a public VIP address directly accessible to external machines.

In some embodiments, the set of one or more gateway routers of each POP is configured to select, for each DNS request that is addressed to the first VIP address, a first-tier service machine of the POP and to forward the DNS request to the selected first-tier service machine. In some embodiments, the gateway router set is configured to perform ECMP to select the first-tier service machine for each DNS request. A POP's gateway router set in other embodiments is configured to distribute the DNS requests among its POP's first-tier service machines through other weighted or unweighted load balancing scheme.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
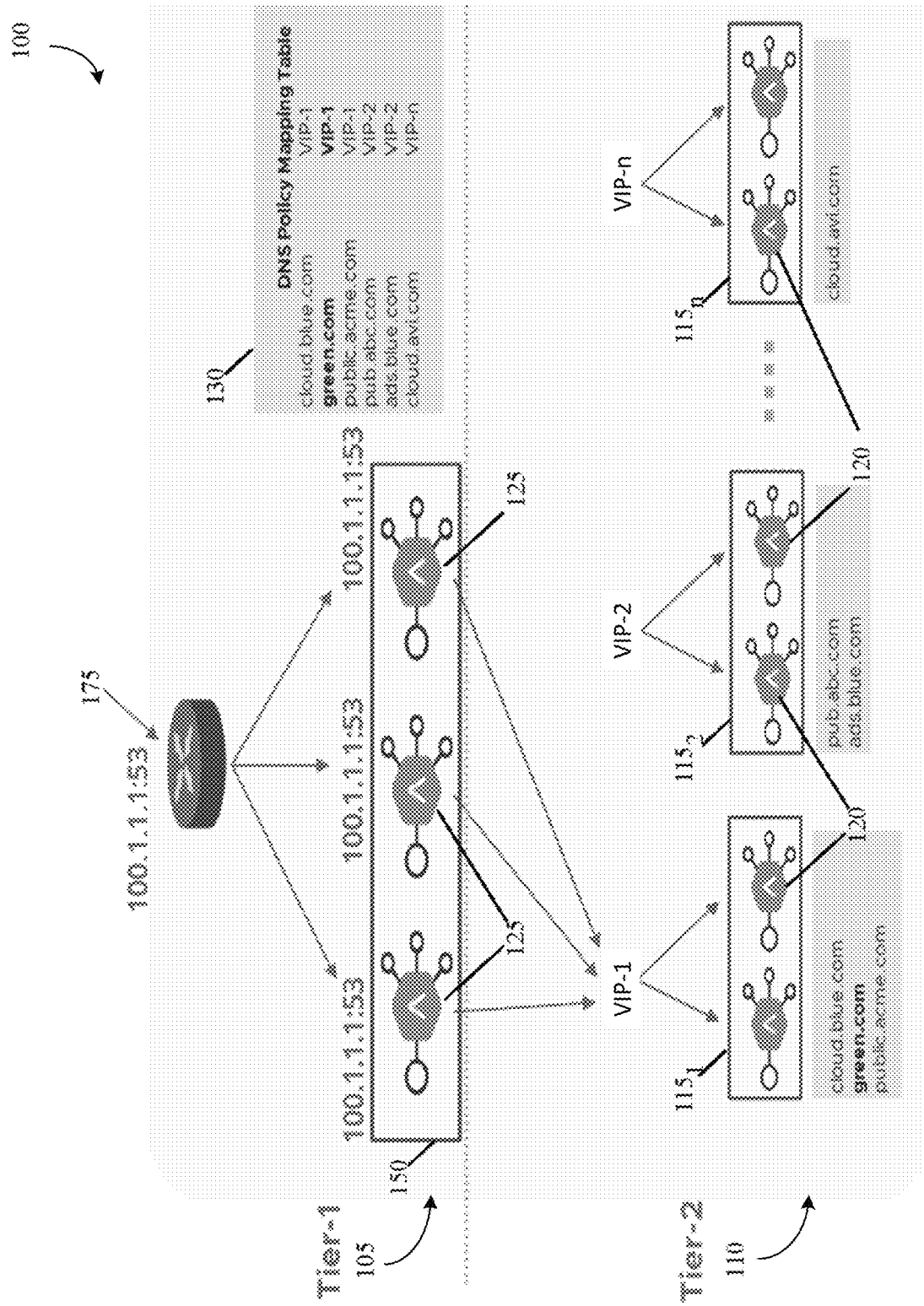
FIG. 1 conceptually illustrates an example of a two-tier DNS service of some embodiments.

Some embodiments provide a two-tier DNS (Domain Name System) service for processing DNS requests. FIG. 1 illustrates an example of a two-tier DNS service 100 of some embodiments. As shown, the DNS service 100 has first and second tiers 105 and 110 of service machines. The service machines in some embodiments can be standalone computers or appliances, and/or other types of machines (such as virtual machines (VMs), Pods, containers, etc.) executing on host computers.

The second-tier 110 has several groups 115 of service machines 120 with each group 115 configured to resolve DNS requests for a different set of FQDNs than the other second-tier group 115. In this example, the second-tier group $115_1$ responds to DNS requests for cloud.blue.com, green.com and public.acme.com, the second-tier group $115_2$ responds to DNS requests for pub.abc.com and ads.blue.com, and the second-tier group $115_n$ responds to DNS requests for cloud.avi.com.

In some embodiments, two second-tier service groups can process DNS requests for two or more FQDNs (fully qualified domain names) that are part of the same domain, and/or for two or more FQDNs that are part of different domains. For example, the second-tier group $115_1$ resolves DNS requests for cloud.blue.com, while the second-tier group $115_2$ resolves DNS requests for ads.blue.com. Also, in some embodiments, one second-tier service group (e.g., second-tier group $115_n$) can be dedicated to one FQDN (e.g., cloud.avi.com).

In the first-tier 105, each service machine 125 is configured to identify the second-tier group 115 responsible for each particular DNS request that the service machine 125 receives for each particular domain name, and to forward the particular DNS request to the second-tier group 115 that it identifies for the particular DNS request. To identify the second-tier group responsible for each DNS request, the first-tier service machines in some embodiments use identical policy mapping tables 130 that associate different FQDNs with VIP addresses associated with different second-tier groups, as further described below. The first-tier DNS service 105 in some embodiments has only one group 150 of service machines. In some embodiments, each first or second service machine group can have one or more service machines, and can be scaled up or down to add or remove service machines to the group (e.g., through an active/active layer 3 scaleout with BGP).

Given that each second-tier group in some embodiments processes DNS requests for a different subset of domain names, each second-tier group serves as a smaller failure domain for only the subset of domain names that it processes. Each second-tier service machine group provides a virtual DNS service that processes the DNS requests for a subset of domain names, and that is addressable through a different VIP address than the VIP address of other second-tier service machine groups.

In the example illustrated in FIG. 1, the three second-tier groups $115_1$, $115_2$, and $115_n$ have VIP address VIP-1, VIP-2 and VIP-n. As shown by the policy mapping tables 130, the FQDNs cloud.blue.com, green.com and public.acme.com are associated with the VIP-1 address of the second-tier group $115_1$, the FQDNs pub.abc.com and ads.blue.com are associated with VIP-2 address of the second-tier group $115_2$, and the FQDN cloud.avi.com is associated with VIP-n address of the second-tier group $115_n$.

For a DNS request that it receives, each first-tier service machine 125 in some embodiments uses its policy mapping table 130 to perform a policy-based L3 and DNS lookup to identify the VIP address associated with the FQDN that is the subject of the received DNS request. The first-tier service machine 125 then forwards the DNS request to the identified VIP address (e.g., by addressing the particular DNS request to this VIP), which belongs to the second-tier service machine group that processes DNS requests for the FQDN.

In some embodiments, an intervening set of one or more forwarding elements (not shown) between the first and second tiers 105 and 110 forward the DNS request to one of the second-tier service machines of the second-tier group associated with the identified VIP address. These forwarding elements are different in different embodiments. For instance, as further described below, the intervening set of forwarding elements are routers in some embodiments that perform ECMP, or another weighted or unweighted distribution scheme, to select, for each DNS request, a next hop interface associated with one service machine from the second-tier group associated with the identified VIP address.

The intervening forwarding elements in other embodiments are load balancers. When processing each DNS request that it receives, each such load balancer receives the DNS request addressed to a particular second-tier DNS group. The load balancer then selects (based on a set of load balancing criteria) one DNS server in the particular second-tier DNS group to process the DNS request, and then changes the destination IP address in this request from the VIP address of the particular second-tier group to individual IP addresses of the DNS server that the load balancer selected for this request. Still other embodiments forward the DNS requests from the first-tier DNS group to the second-tier DNS groups differently. For instance, in some embodiments, for each DNS request, each first-tier service machine selects the service machines (in the second-tier group that the first-tier service machine identifies for the DNS request) that should process the DNS request, and uses another forwarding scheme (e.g., L2 tunneling) to forward the DNS request to the selected service machine.

In some embodiments, each DNS request is received at each first-tier service machine addressed to a VIP address of the first-tier group that is different than the VIP addresses used by the second-tier groups. In FIG. 1, the VIP address of the first-tier service group is 100.1.1.1, which is an IP address that is advertised to external network(s) (e.g., Internet) by a gateway router 175 of the two-tier DNS service 100. This VIP address (100.1.1.1) is different than the second-tier group VIP addresses (e.g., VIP-1, VIP-2 and VIP-n addresses), which are private VIP addresses that are directly addressable to the second-tier groups from external machines in the external network.

This is in contrast to the VIP address of the first-tier service machines, which is a public VIP address directly addressable by the external machines. As further described below by reference to FIG. 4, the first-tier group's VIP address in some embodiments is an anycast VIP address that is used by multiple first-tier groups of multiple different sites that provide the two-tier DNS service.

Figure 2:
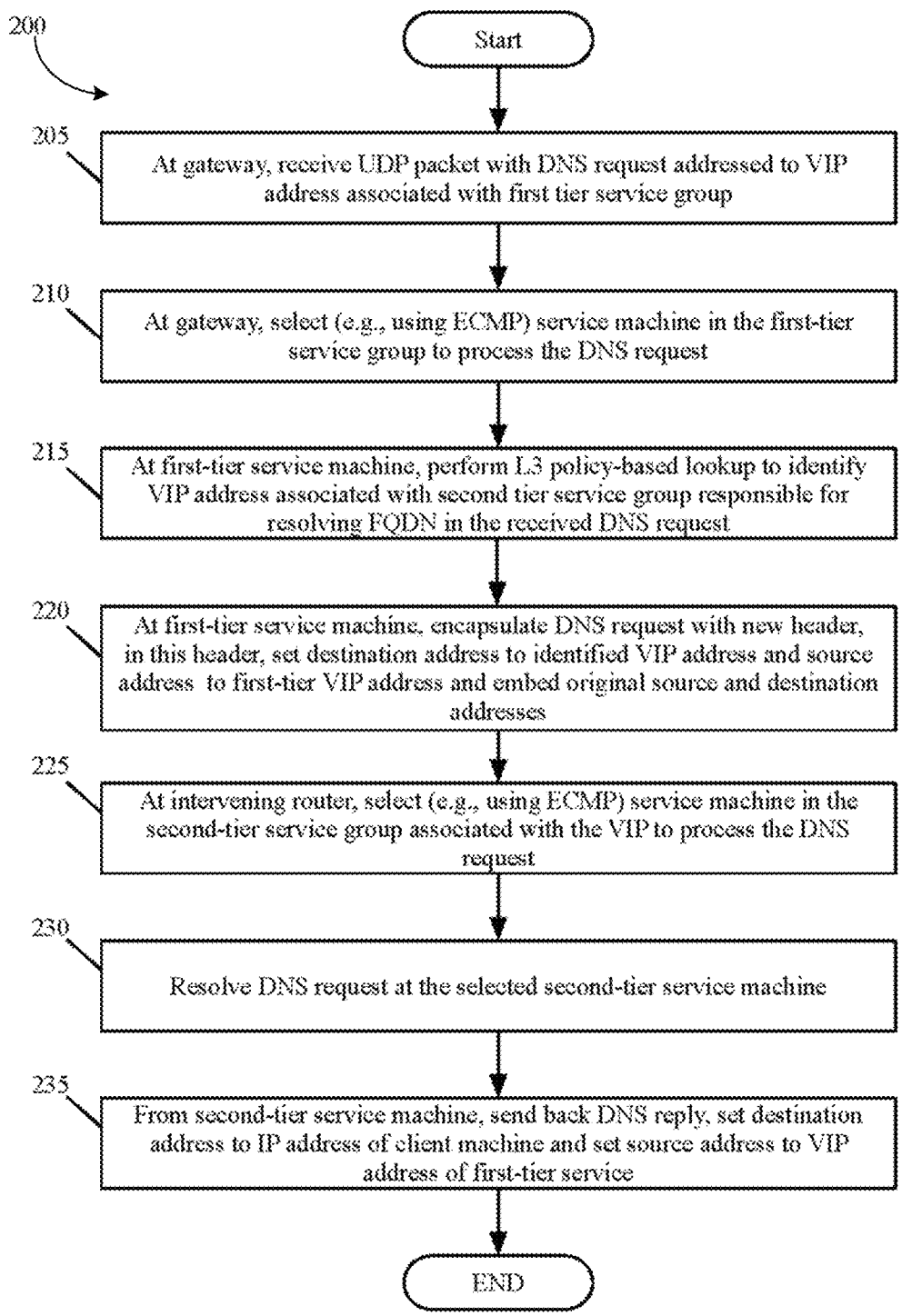
FIG. 2 conceptually illustrates a process that the different components of the two-tier DNS service in FIG. 1 perform to process a DNS request that is sent as a UDP packet.

FIG. 2 illustrates a process 200 that the different components of the two-tier DNS service 100 perform to process a DNS request that is sent as a UDP packet. This process will be described by reference to FIG. 3, which illustrates an example of the processing of a DNS request. As shown, the process 200 starts (at 205) when the gateway router 175 of the DNS service 100 receives a DNS request as a UDP packet. This packet has a destination IP address that is the VIP address of the first-tier service machine group 150. In some embodiments, a client sends the DNS request for an FQDN via a DNS resolver, and the DNS authority for this is the Tier-1 anycast address.

Figure 3:
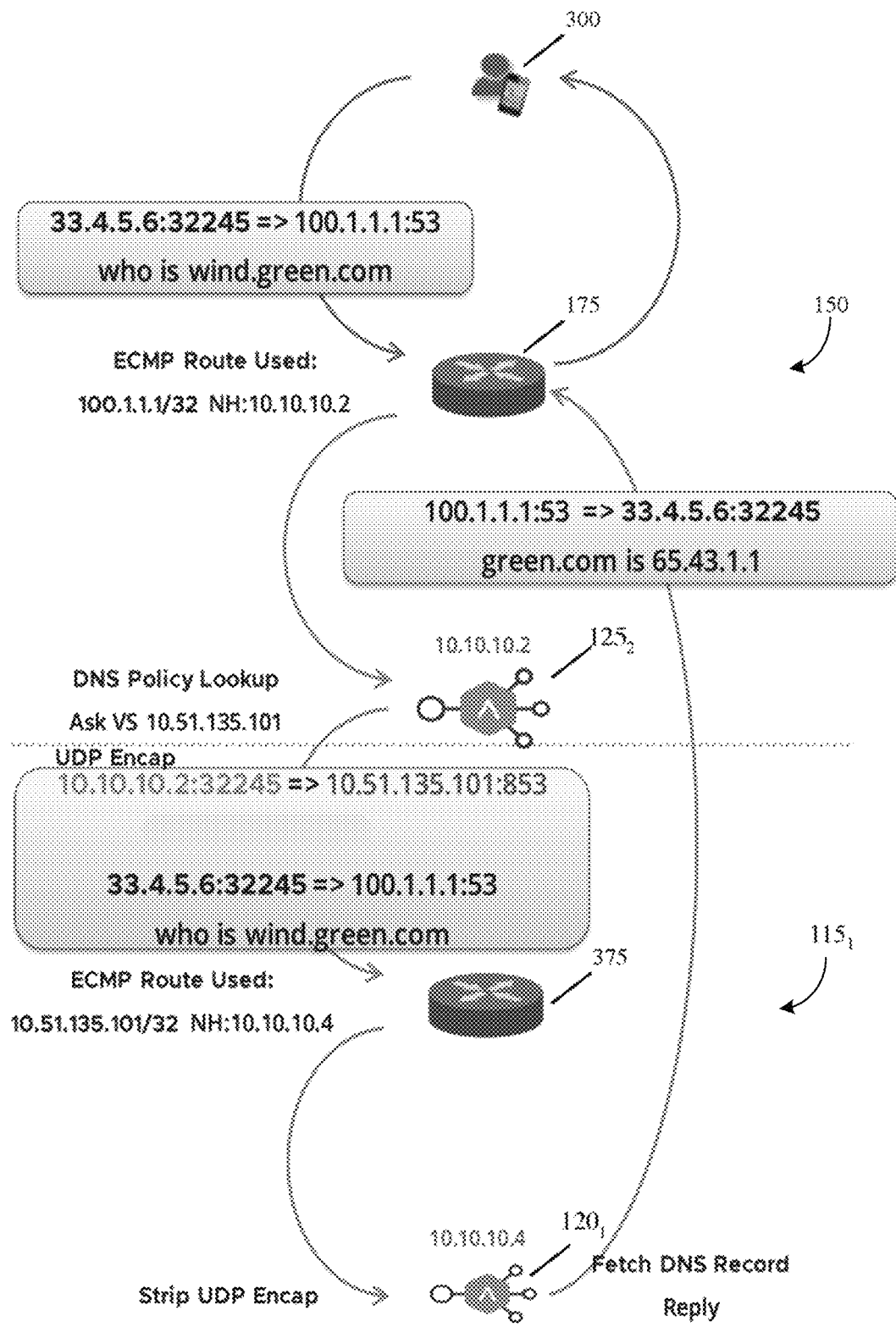
FIG. 3 conceptually illustrates an example of the processing of a DNS request.

FIG. 3 illustrates the gateway router 175 receiving a DNS request with a source IP address 33.4.5.6 and a destination IP address 100.1.1.1. The source IP address is the IP address of a client machine 300 that sent the DNS request, while the destination IP address is the anycast VIP address of the first-tier service machine group 150. In this example, the DNS request is for the FQDN wind.green.com. This DNS request is sent from the client machine 300 through external routers to the gateway router 175 of the two-tier DNS 100.

After receiving this request, the gateway router 175 selects (at 210) a service machine 125 of the first-tier group 150 to process this DNS request. In some embodiments, the gateway router 175 performs an ECMP operation to select this service machine. This operation in some embodiments selects the router's next-hop interface that is associated with one first-tier service machine from several next-hop interfaces that are associated with the several service machines of the first-tier group 150, and passes the DNS request along this next-hop interface. FIG. 3 shows the gateway router 175 passing the DNS request to the selected service machine $125_2$ along its next-hop interface associated with the internal IP address 10.10.10.2 of this service machine.

At 215, the selected first-tier service machine (e.g., the service machine $125_2$ in FIG. 3) then performs an L3 and DNS policy-based lookup for the FQDN in the DNS request (e.g., for wind.green.com) in its policy mapping table 130. This lookup identifies the VIP address of the second-tier service group that should process the DNS request. In FIG. 3, the identified second-tier service group is the second-tier service group $115_1$ as it handles all the DNS requests for the domain green.com.

The selected first-tier service machine adds (at 220) a UDP encapsulating header, which has a destination IP address of the identified second-tier service group. In some embodiments, this encapsulating header also has the VIP address of the first-tier service group as its source IP address. This header also stores the IP address of the source client machine as additional data that the DNS resolving second-tier machine can use to send the DNS reply directly back to the client machine.

FIG. 3 illustrates the first-tier machine $125_2$ (1) adding a new UDP encapsulating header to the DNS request, (2) changing the destination IP address from 10.10.10.2 to the VIP address 10.51.135.101 of the second-tier service group $115_1$ identified at 215, and (3) changing the source IP address to 10.1.1.1 from the IP address 33.4.5.6 of the client machine 300. The IP address 33.4.5.6 is stored in the UDP encapsulating header.

Next, an intervening router between the first and second-tiers directs (at 225) the newly encapsulated DNS request to one service machine in the second-tier service group $115_1$ identified at 215. In some embodiments, this intervening router performs an ECMP operation to select this service machine. This operation in some embodiments selects the router's next-hop interface that is associated with a service machine of the identified second-tier group, from several next-hop interfaces that are associated with the service machines of the identified second-tier service group, and passes the DNS request along this next-hop interface.

FIG. 3 shows the intervening router 375 passing the DNS request with its new UDP encapsulated header to the service machine $120_1$ along its next-hop interface associated with the internal IP address 10.10.10.4 of the service machine $120_1$ of the identified second-tier service group $115_1$. As shown, the intervening router 375 performs an ECMP operation to select the service machine in the identified second-tier service group $115_1$. In some embodiments, the intervening router 375 is the gateway router 175 as this router handles both north-south traffic and east-west traffic for the two-tier DNS service. In other embodiments, the intervening router 375 is a different router of the two-tier DNS service 100 than the gateway router 175.

As mentioned above, other embodiments use other schemes for forwarding the DNS requests from the first-tier DNS group to the DNS servers of the second-tier DNS groups. For instance, when the intervening forwarding elements are load balancers, each load balancer selects (based on a set of load balancing criteria) one DNS server in the particular second-tier DNS group to process each DNS request that it receives, and then changes the destination IP address in this request from the VIP address of the particular second-tier group to individual IP addresses of the DNS server that the load balancer selected for this request.

At 230, the selected second-tier service machine strips the encapsulating UDP header and resolves the DNS request. This resolution entails selecting one IP address associated the FQDN that is subject of the DNS request, from one or more available IP addresses that are associated with this FQDN. In FIG. 3, the second-tier machine $120_1$ produces the IP address 65.43.1.1 as the IP address that corresponds to the FQDN wind.green.com.

From the encapsulating UDP header, the selected second-tier service machine identifies the IP address of the client machine that is the source of the original UDP packet that contained the DNS request. Hence, at 235, the selected second-tier service machine formulates a DNS reply (containing the IP address produced from the DNS resolution), and specifies the client machine's IP address as a destination IP address and the first-tier service group's VIP as the source IP address of the DNS reply. FIG. 3 shows the service machine $120_1$ sending the DNS reply to the IP address 33.4.5.6 from the VIP 10.1.1.1 along the same ports (32245 and 53) that were used by the DNS request. It also shows the gateway router 175 passing this DNS reply to the source client machine 300 through intervening external routers (not shown). After 235, the process then ends.

In some embodiments, the two-tier DNS service 100 handles DNS requests that are sent as TCP packets slightly differently. For instance, in some embodiments, the second-tier service machine that resolves the DNS request does not send the DNS reply directly to the source client machine. Instead, in these embodiments, it sends the DNS reply to the first-tier service machine that forwarded the DNS request to its second-tier service group, and this first-tier service machine sends the DNS reply back to the source client machine.

FIG. 3 illustrates that the VIP address of the first-tier service group in some embodiments is an anycast VIP address, 100.1.1.1 that for a DNS request is accessible through port 53. An anycast VIP address is an IP address used by several different groups of first-tier service machines in several different geographic sites (e.g., several different buildings, cities, counties, states, countries, etc.). These sites are referred to below as Points of Presence (POPs), with each POP having one group of first-tier service machines and one or more groups of second-tier service machines. The POPs are part of one wide-area network (WAN) in some embodiments.

Instead of using UDP encapsulation, other embodiments use other encapsulation techniques to forward DNS requests from the first-tier DNS group to selected second-tier DNS groups. For instance, a first-tier DNS server in some embodiments uses an IP-on-IP encapsulation that encapsulates a DNS request's original IP header with another IP header that stores the VIP address of the second-tier DNS group that the first-tier DNS server identifies for processing the DNS request. Under this approach, the original source and destination IP addresses in the original IP header are left unchanged by the first-tier DNS server, so that the second-tier DNS server that eventually processes the DNS request can use the original source and destination IP addresses when formulating the DNS reply for direct forwarding to the client machine that was the original source of the DNS request.

Figure 4:
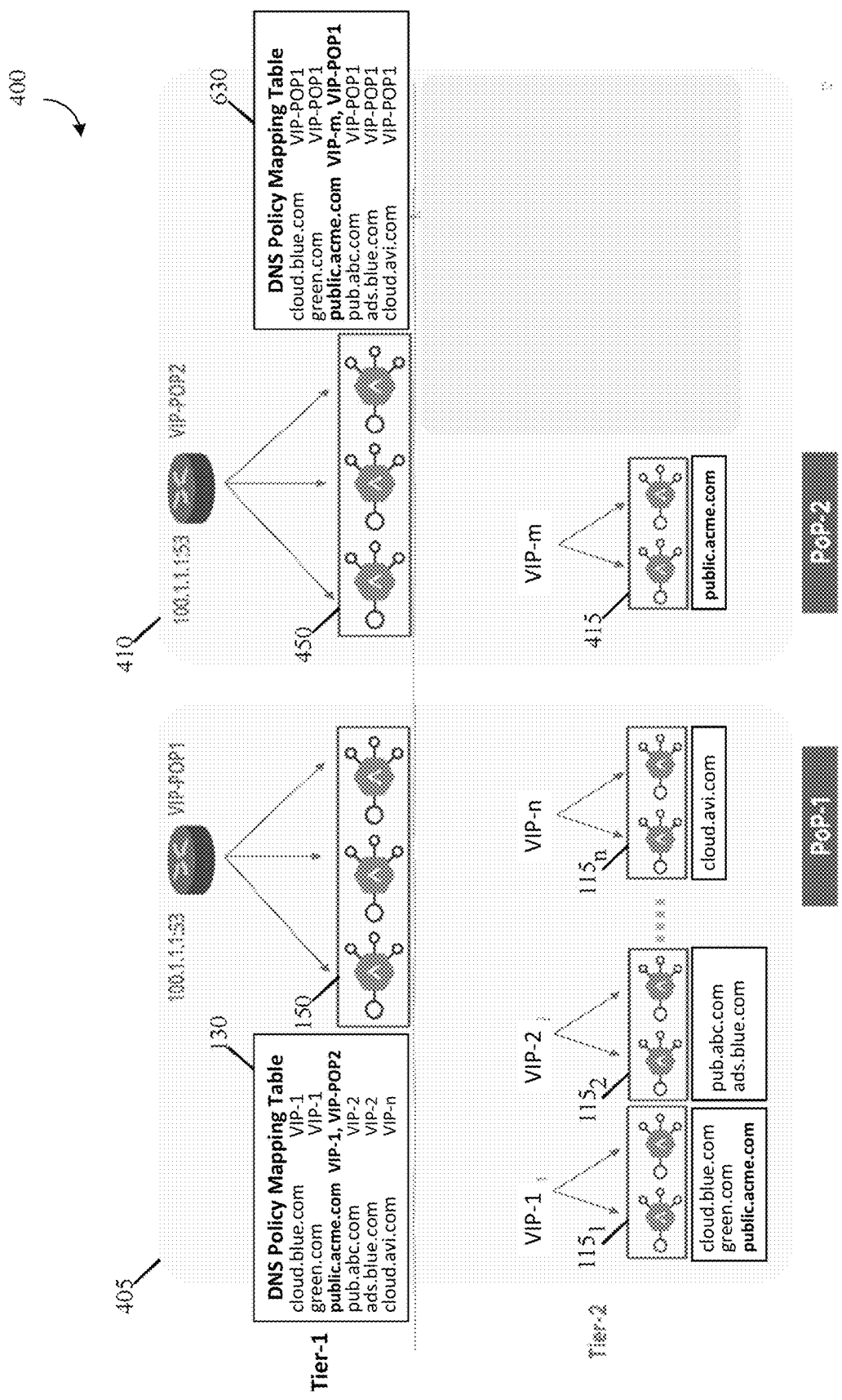
FIG. 4 conceptually illustrates a multi-POP DNS service with two POPs.

FIG. 4 illustrates a multi-POP DNS service 400 with two POPs 405 and 410. These two POPs implement a common two-tier DNS service that has one first-tier service group 150 or 450 in each POP and one or more second-tier service groups 115 or 415 in each POP. These two POPs are in two geographic sites (e.g., two different cities, states, countries, or continents) but their first-tier service groups 150 and 450 are accessible through the same anycast VIP address 100.1.1.1. In addition, each POP's first-tier service group has a POP-specific public IP that is used by the first-tier service group of the other POP to send DNS requests that are not processed by the other POP's first-tier service group. In this case, the first-tier service group 150 of POP 405 has a VIP-POP1 while the first-tier service group 450 of the second POP 410 has a VIP-POP2.

Also, in this example, the POP 405 has the three second-tier service groups 115 that processed DNS requests for the FQDNs discussed above, while the POP 410 has one second-tier service group 415 that processes DNS requests for public.acme.com. As mentioned above, second-tier service group $115_1$ also processes DNS requests for public.acme.com. When the POP 410 receives a DNS request for public.acme.com, the first-tier service group 450 of this POP can decide to have its second-tier service group 450 processes this DNS request, or it can re-direct this request to the POP 405.

In some embodiments, the first-tier service group of each POP is biased towards using its own second-tier service group for an FQDN that is also handled by other second-tier service group(s) in other POP(s). However, in some cases, the first-tier service group of a POP might re-direct a DNS request that its second-tier service group can process to another POP when the first-tier service group detects a condition that merits such a re-direct (e.g., too much load on its own second-tier service group).

The first-tier service group 450 of the POP 410 also re-directs DNS requests to the POP 405 when the DNS requests are for FQDNs that are not serviced by the second POP's second-tier service group 415. In this example, these are all DNS requests for cloud.blue.com, green.com, pub.abc.com, ads.blue.com and cloud.avi.com. To identify the second-tier VIPs responsible for the FQDNs associated with each DNS request, each first-tier service group of each POP uses similar policy mapping tables 130 that may only differ in the VIP addresses of FQDNs that are handled by multiple POPs. When a POP processes DNS requests for an FQDN along with one or more other POPs, the policy-mapping table 130 or 630 of the POP stores the VIP address of its second-tier service group (if any) that processes the FQDN DNS queries, along with the VIP address of the first-tier service group (if any) of each other POP that processes DNS queriers for the same FQDN.

In FIG. 4, this means that for public.acme.com (1) the policy-mapping table 130 of the first POP 405 stores VIP-1 of second-tier service group $115_1$ of the first POP, and VIP-POP2 of the first-tier service group 450 of the second POP, and (2) the policy-mapping table 630 of the second POP 410 stores VIP-m of second-tier service group 415 of the second POP, and VIP-POP1 of the first-tier service group 150 of the first POP. For the rest of the FQDNs, the policy mapping table 630 of FIG. 6 stores the VIP-POP1 address that is associated with the first-tier service group 150 of the POP 405. This is because these rest of the FQDNs are processed by the second-tier service groups of the POP 405.

Even though the POPs share the same policy mapping tables and the same second-tier service groups, each POP maintains its own metrics and logs for each DNS service offered by each second-tier service group. In some embodiments, each POP periodically distributes its metrics and logs to other POPs, while in other embodiments the POPs do not distribute their metrics and logs to other POPs. Each POP uses its metrics and logs to assess when it needs to scale up or down the service machines in its first-tier service group or one of its second-tier service group.

In some embodiments, the gateway routers of the POPs advertise (e.g., through BGP) the anycast VIP address to the external routers of the external network(s) (e.g., to the Internet). Also, in some embodiments, the POP-private VIP addresses of each second-tier group is advertised to other routers that are in the same POP as the second-tier service group.

Each external router outside of the POP networks (e.g., outside of the POP LANs or POP WAN) forwards each DNS request that it receives to a first-tier group of one of the POPs. For instance, for each DNS request, each external router in some embodiments identifies a next-hop interface that is associated with a first-tier group of one of the POPs, and forwards the DNS request to the identified interface so that it can eventually reach the associated first-tier group. When an external router uses a BGP routing protocol, the next-hop interface is the interface associated with the "closest" first-tier group (e.g., the first-tier group within the fewest hops to the external router).

To re-direct a DNS request from a first POP (e.g., 410) to a second POP (e.g., 405), the first-tier service group of the first POP (410) encapsulates the DNS request with a new UDP encapsulating header. This header has the POP-to-POP VIP address of the second POP (e.g., 405) as a destination IP address, and the anycast VIP as a source IP address. In some embodiments, this encapsulating header also stores the IP address of the source client machine as additional data that the DNS resolving second-tier machine of the second POP (e.g., 405) can use to send the DNS reply directly back to the client machine.

The first-tier service groups of the POPs do not use anycast VIP for the DNS requests that they re-direct to the first-tier service groups of other POPs for several reasons. First, using the encapsulating UDP headers instead of anycast VIP ensures that the re-directed DNS requests are not sent back to the re-directing first-tier service groups. Second, the encapsulating UDP headers allow the first-tier service groups that receive the re-directed DNS requests to detect that the DNS requests have been re-directed to them from other first-tier service groups, and account for this in performing their second-tier service group selection and in their metric data collection.

Figure 5:
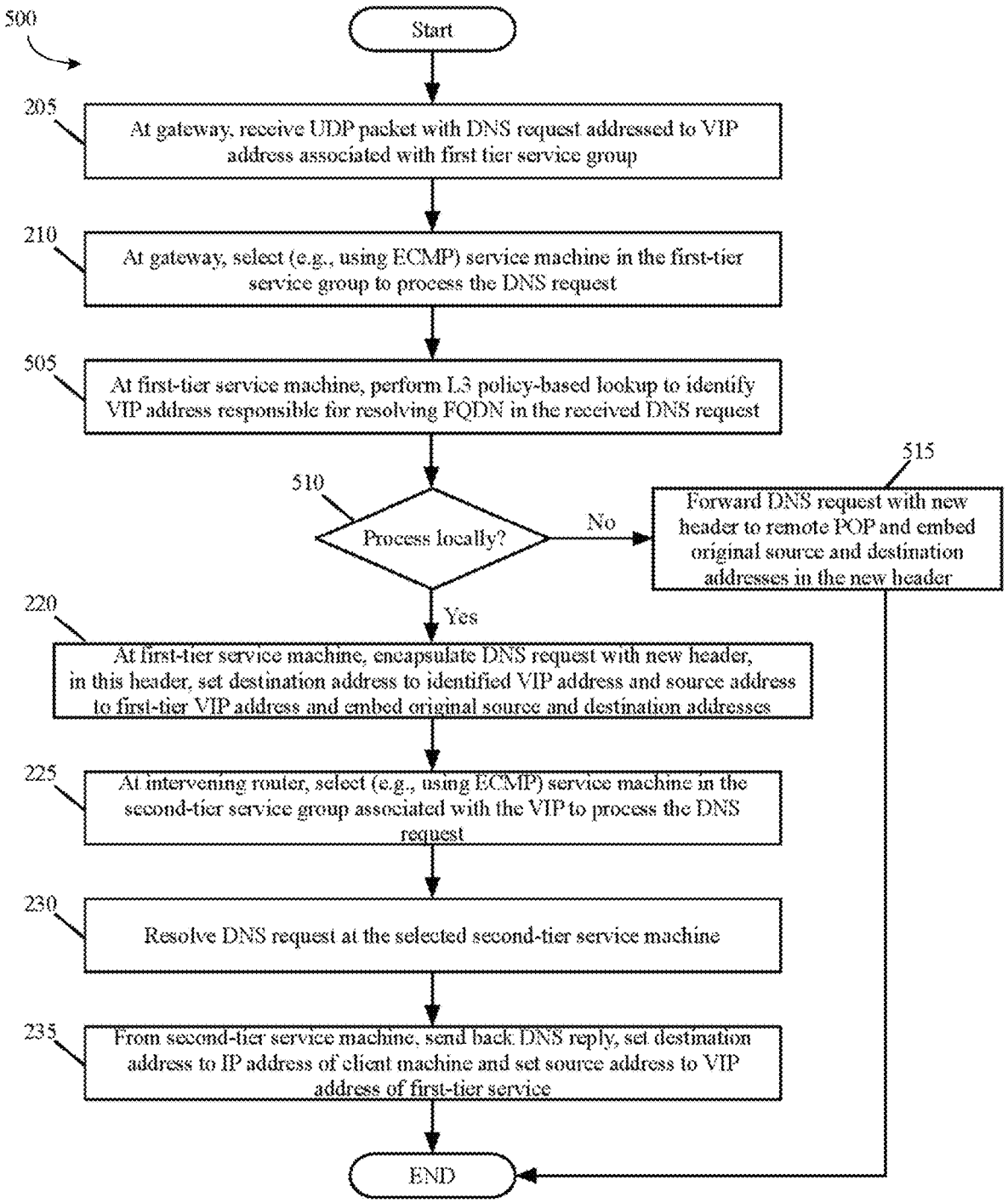
FIG. 5 conceptually illustrates a process that the components of a multi-POP DNS service perform to process a DNS request that is sent as a UDP packet.

FIG. 5 illustrates a process 500 that the components of a multi-POP DNS service (e.g., DNS service 400) perform to process a DNS request that is sent as a UDP packet. This process 500 is identical to the process 200 of FIG. 2, except that it has three extra operations 505-515. The process 500 will be described by reference to FIG. 6, which illustrates an example of the multi-POP DNS service 400 processing of a DNS request. As shown, the process 500 starts when a gateway router of one of the POPs receives (at 205) a DNS request as a UDP packet. This packet has the DNS service's anycast VIP as its destination IP address.

Figure 6:
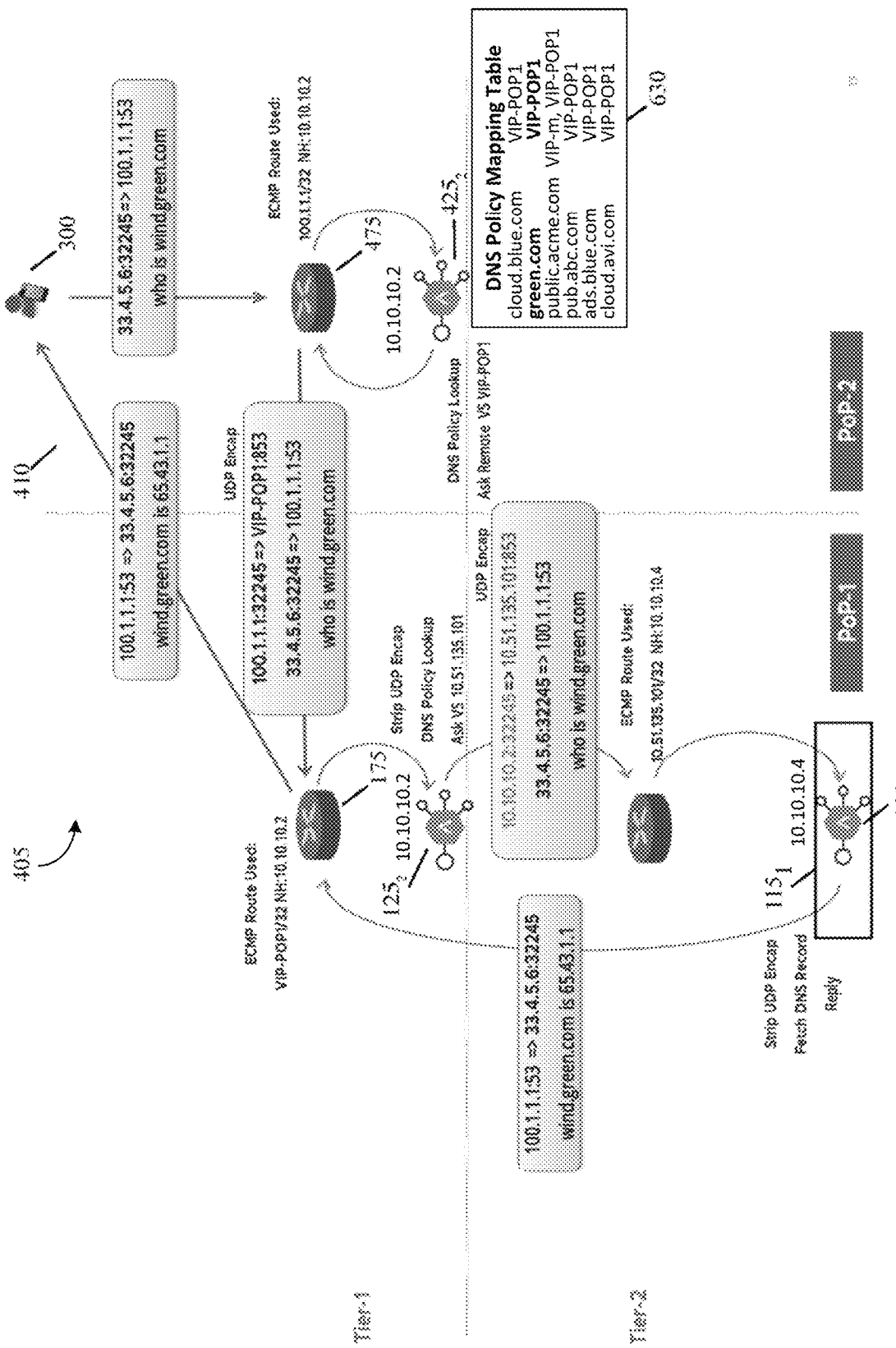
FIG. 6 illustrates an example of the multi-POP DNS service processing of a DNS request.

FIG. 6 illustrates the gateway router 475 receiving a DNS request with a source IP address 33.4.5.6 and a destination IP address 100.1.1.1. The source IP address is the IP address of a client machine 300 that sent the DNS request, while the destination IP address is the anycast VIP address of the first-tier DNS service 105 (used by the first-tier groups 150 and 450). In this example, the DNS request is again for the FQDN wind.green.com, and is sent from the client machine 300 through external routers to the gateway router 475 of the two-tier DNS 400.

After receiving this request, the gateway router 475 selects (at 210) a service machine 425 of the first-tier group 450 to process this DNS request. In some embodiments, the gateway router 475 performs an ECMP operation to select this service machine. This operation in some embodiments selects the router's next-hop interface that is associated with one first-tier service machine from several next-hop interfaces that are associated with the several service machines of the first-tier group 450, and passes the DNS request along this next-hop interface. FIG. 6 shows the gateway router 475 passing the DNS request to the selected service machine 425$_2$ along its next-hop interface associated with the internal IP address 10.10.10.2 of this service machine.

Next, at 505, the process 500 has the selected first-tier service machine perform an L3 policy-based lookup for the FQDN that is subject of the DNS request. The first-tier service machine performs this lookup using its policy mapping table that maps FQDNs to VIP addresses of second-tier service groups within the same POP and/or VIP address(es) of first-tier service group(s) in other POP(s). In FIG. 6, the policy mapping table 630 stores for green.com the VIP-POP1 address of POP1 that is associated with the first-tier service group 150 of POP 405.

A lookup at 505 can identify a VIP address of a local second-tier service group that can resolve the DNS request (i.e., for the FQDN that is subject of the DNS request), and/or one or more VIP addresses of one or more remote first-tier service groups of other POPs. Hence, the first-tier service machine that performed the lookup determines (at 510) whether the DNS request should be locally processed by a second-tier service group of the same POP.

When the first-tier service machine's lookup identifies just a VIP address of a local second-tier service group, the process 500 performs the operations 220-235, which were described above for FIG. 2. On the other hand, when the lookup just identifies one or more VIP addresses of one or more remote first-tier service groups of other POPs, the first-tier service machine has to select the first-tier service group of another POP, and forward the DNS request to this other POP.

Also, when the lookup identifies a VIP address of a local second-tier service group and one or more VIP addresses of one or more remote first-tier service groups of other POPs, the first-tier service machine has to determine whether to process the DNS request locally or remotely. As mentioned above, the first-tier service group of any POP is biased towards using its own POP's second-tier service group for a DNS request that can be processed locally or remotely, but does overcome this biasing when it detects certain conditions, such as failure of or too much load on its own second-tier service group.

To forward a DNS request to the first-tier service group of another POP, the first-tier service machine adds (at 515) a UDP encapsulating header, which has the VIP address of the first-tier service group of the other POP as a destination IP address, and the anycast VIP as a source IP address. In some embodiments, this encapsulating header also stores the IP address of the source client machine as additional data that the DNS resolving second-tier machine of the other POP can use to send the DNS reply directly back to the client machine.

FIG. 6 illustrates the first-tier machine 425$_2$ (1) adding a new UDP encapsulating header to the DNS request, (2) changing the destination IP address from 10.10.10.2 to the VIP-POP1 address of the first-tier service group 150 of the POP 405, (3) changing the source IP address to the anycast VIP 10.1.1.1, and (4) storing the IP address 33.4.5.6 of the client machine 300 as additional data in the UDP encapsulating header.

At POP 405, the gateway router 175 receives the encapsulated UDP packet, selects (e.g., through an ECMP operation or other weighted or unweighted distribution operation) a service machine 125$_2$ of the first-tier group 150 to process this DNS request, and then forwards the received UDP packet to the selected first-tier service machine (e.g., along its next-hop interface associated with the selected first-tier service machine). The first-tier service machine 125$_2$ removes the encapsulating UDP header and performs an L3 policy-based lookup for the FQDN wind.green.com in its policy mapping table 130, and identifies the VIP address of the second-tier service group 115$_1$ that should process the DNS request.

The first-tier machine 125$_2$ then (1) adds a new UDP encapsulating header to the DNS request, (2) changes the destination IP address from 10.10.10.2 to the VIP address 10.51.135.101 of the second-tier service group 115$_1$, (3) changes the source IP address to 10.1.1.1, and (4) stores the source client machine's IP address 33.4.5.6 in the UDP encapsulating header. Next, an intervening router between the first and second tiers identifies (e.g., through ECMP or other distribution scheme) one service machine 120$_1$ in the second-tier service group 115$_1$ to receive the UDP encapsulated DNS request, and directs this request to this service machine $125_2$ by passing the DNS request packet along its next-hop interface associated with the internal IP address 10.10.10.4 of the service machine $120_1$ of the identified second-tier service group $115_1$.

The selected second-tier service machine then receives the DNS request, strips the encapsulating UDP header and resolves the DNS request. This resolution entails selecting one IP address associated the FQDN that is the subject of the DNS request, from one or more available IP addresses that are associated with this FQDN. In FIG. 6, the second-tier machine $120_1$ produces the IP address 65.43.1.1 as the IP address that corresponds to the FQDN wind.green.com.

From the encapsulating UDP header, the selected second-tier service machine identifies the IP address of the client machine that is the source of the original UDP packet that contained the DNS request. Hence, the selected second-tier service machine $120_1$ formulates a DNS reply (containing the IP address produced from the DNS resolution), and specifies the source client machine's IP address as a destination IP address and the first-tier service group's VIP as the source IP address of the DNS reply. The gateway router 175 then passes this DNS reply to the source client machine 300 through intervening external routers (not shown).

As mentioned above, other embodiments use other encapsulation techniques to forward DNS requests from the first-tier DNS group to selected second-tier DNS groups instead of using UDP encapsulation. For instance, as mentioned above, a first-tier DNS server in some embodiments uses an IP-on-IP encapsulation that encapsulates a DNS request's original IP header with another IP header that stores the VIP address of the second-tier DNS group that the first-tier DNS server identifies for processing the DNS request. Under this approach, the original source and destination IP addresses in the original IP header are left unchanged by the first-tier DNS server, so that the second-tier DNS server that eventually processes the DNS request can use the original source and destination IP addresses when formulating the DNS reply for direct forwarding to the client machine that was the original source of the DNS request.

In some embodiments, the second-tier service machines perform health-monitoring operations to ensure that the servers that service the FQDNs are operating at an acceptable operational level. As mentioned above, one FQDN can be directed to multiple servers that execute programs that are accessible to client machines through the FQDN. In such cases, the service machines of a second-tier service group can resolve the DNS request for the FQDN to the IP address of any one of these servers. To ensure that all the server machines are operating at an acceptable operational level, the second-tier service machines perform health-monitoring operations for all the servers that are associated with the same FQDN.

Given that the second-tier service machines have an internal VIP address within the two-tier DNS service, the two-tier DNS service in some embodiments has to perform SNAT (source network address translation) on health monitoring messages that the second-tier service machines send to the external servers that are associated with the FQDNs, and DNAT (destination NAT) on replies that the external servers send back to the second-tier service machine in response to the health monitoring messages.

Figure 7:
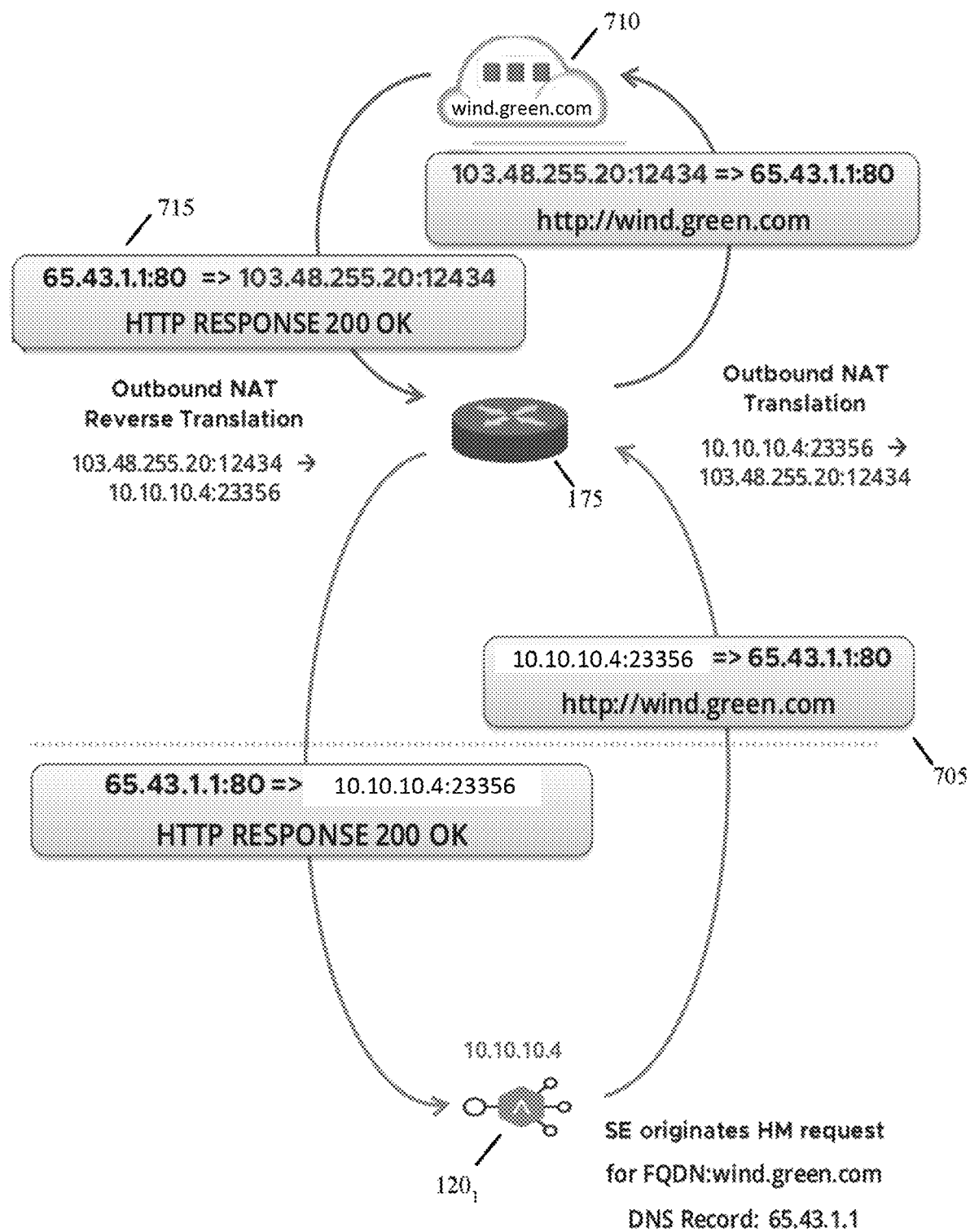
FIG. 7 conceptually illustrates the gateway of the DNS service in FIG. 1 performing an SNAT operation on a health monitoring message sent from the second-tier service machine to the server associated with the FQDN.

FIG. 7 illustrates one such approach for performing these NAT operations. Specifically, this figure shows the gateway 175 of the DNS service 100 performing an SNAT operation on a health monitoring message 705 sent from the second-tier service machine $120_1$ to the server 710 associated with the wind.green.com FQDN. This SNAT operation changes the source IP address from the internal IP address of the second-tier service machine $120_1$ to the public unicast VIP address of the POP of the second-tier service machine. The port addresses are also translated as shown.

FIG. 7 shows the server 710 receiving the health monitoring message after it has been network address translated, and sending back a reply message 715 with a destination IP address set to the POP's public VIP address. It further shows the gateway 175 performing a DNAT operation that changes this destination IP address to the internal IP destination address of the second-tier service machine $120_1$. The health monitoring reply message has a time value (200) for the http response, which can be used as a metric value to gauge the health of the server 710.

The two-tier DNS service of some embodiments has several security and scaling advantages. It has superior security advantages as the first-tier security group in a POP shields the second-tier security groups in the same POP or other POPs from external attacks, such as spurious DNS requests that are part of distributed denial of service (DDoS) attacks. Based on statistics collected by each POP's first-tier security group, each first-tier security group can scale up with additional service machines to handle the extra load from DDOS attacks, and it can rate limit DNS requests from source IP addresses that are sending too many DNS requests. Also, some embodiments use a common control plane that orchestrates Tier-1 and Tier-2 DNS services. Through this control plane, DDOS prevention policies can be pro-actively placed on other Tier-1s and Tier-2s, based on threat intelligence from one Tier-1 or Tier-2.

Based on these statistics, first-tier security group(s) can also be configured to reject or rate-limit DNS requests that emanate from known malicious source IP addresses. The first-tier security groups of each POP essentially shields the second-tier service machines of its POP and other POPs from undue load of malicious DNS attacks. In some embodiments, the statistics collected by a first-tier security group of a first POP regarding DNS requests that are re-directed to other first-tier security group(s) of other POP(s) are also analyzed to assess whether a second-tier security group should be added to the first POP.

Figure 8:
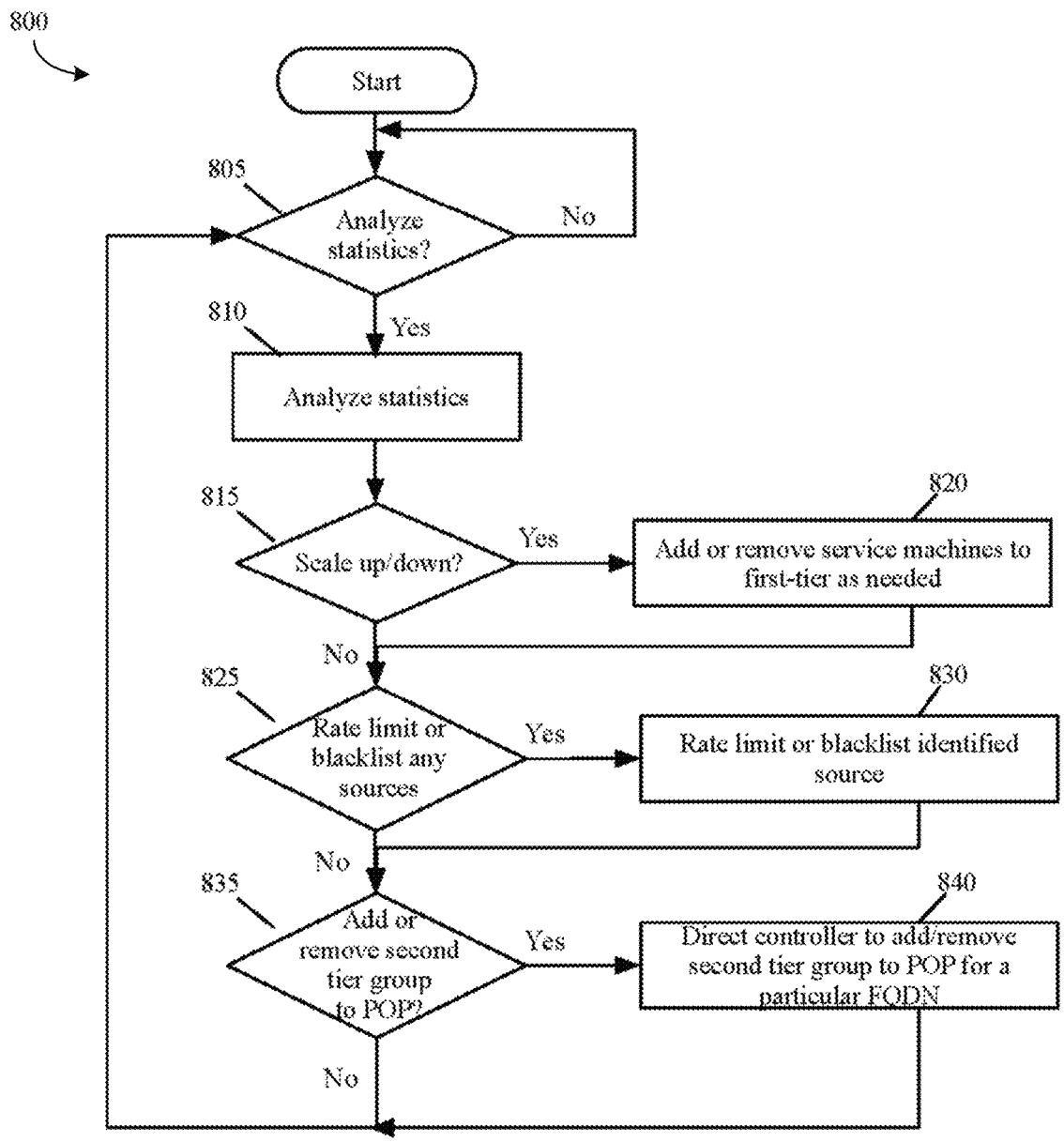
FIG. 8 conceptually illustrates a process that is performed at a POP to scale up or down a first-tier security group of the POP based on statistics collected by the first-tier security group.

FIG. 8 conceptually illustrates a process 800 that is performed at a POP to scale up or down a first-tier security group of the POP based on statistics collected by the first-tier security group. In some embodiments, this process is performed by one or more processes of a controller operating at the POP. In other embodiments, this process is performed by the first-tier security group service machines of the POP as part of one or more other processes. In still other embodiments, some parts of the process 800 are performed by the first-tier security group service machines, while other parts are performed by the controller operating at the POP.

At 805, the process determines whether statistics collected by the first-tier security group of the POP have to be analyzed. This determination ensures that the process 800 is periodically performed in some embodiments. Also, this determination is implemented in terms of a timer that expires and is re-set periodically. The process 800 remains at 805 until it determines that the statistics collected by the first-tier service group has to be analyzed, and which time, it analyzes (at 810) the statistics collected by the different service machines in the first-tier service group.

Based on this analysis, the process then determines (at 815) whether it should add or remove service machines to the first-tier service group. The process in some embodiments adds service machines when the load on existing machines in the first-tier service group exceeds a first threshold value for a duration of time, while it removes service machines when the load on the existing machines in the first-tier service group falls below a second threshold for a duration of time.

The ability to add service machines to the first-tier service group allows the two-tier DNS service of some embodiments to dynamically grow the first-tier to address additional legitimate or malicious load on the first-tier. Example of malicious load are spurious DNS requests from a DDoS attack. Also, dynamically removing a service machine from the first-tier service group allows the two-tier DNS service to reduce the amount of resource consumed by the first-tier when the legitimate or malicious load on the first-tier subsides.

When the process determines (at 815) that it should not add or remove service machines to the first-tier service group, it transitions to 825. On the other hand, when the process determines (at 815) that it should add or remove service machines to the first-tier service group, the process (at 820) adds or removes a service machine to or from the first-tier service group, and then transitions to 825. After adding or removing service machines from the first-tier service group, the gateway routers are configured (e.g., through BGP or through a control plane) to update next-hop forwarding records to account for the added or removed service machines.

Based on the analysis of the collected statistics, the process determines (at 825) whether it should rate limit or blacklist any source IP addresses that are used to send DNS requests. In some embodiments, these are source IP addresses that are sending more than a threshold number of DNS requests and/or that in conjunction with other source IP addresses are sending more than a threshold amount of DNS requests for a particular set of one or more FQDNs. The rate-limited or blacklisted IP addresses are also the IP addresses identified by third-party services as common sources (e.g., as BOTs) of non-legitimate DNS requests.

When the process determines (at 815) that it should not rate limit or blacklist any source IP addresses that are used to send DNS requests, it transitions to 835. On the other hand, when the process determines (at 825) that it should rate limit or blacklist any source IP addresses that are used to send DNS requests, the process (at 830) rate limits or blacklists any source IP addresses that are used to send DNS requests, and then transitions to 835. Rate limiting in some embodiments involves only queuing the DNS requests that come from a particular source and only processing these DNS requests at a particular lower rate. This queuing might result in some of the DNS requests being dropped in some embodiments. Also, blacklisting source IP addresses in some embodiments entails generating firewall rules for a firewall of the gateway router or other firewall to enforce, in order to ensure that DNS requests coming from a blacklisted source IP address is dropped before reaching the first-tier service group.

Based on the analysis of the collected statistics, the process determines (at 835) whether it should add one or more second-tier service group for one or more FQDNs that currently do not have their DNS requests processed locally. In some embodiments, the process determines that such a second-tier service group should be added when the statistics indicate that more than a threshold value of DNS requests are being received at the local first-tier service group of the POP for an FQDN and these requests are being re-directed to other POP(s) as no local second-tier service group processes the DNS requests for the FQDN.

The process 800 also determines (at 835) whether it should remove one or more second-tier service group for one or more FQDNs that currently have their DNS requests processed locally. In some embodiments, the process determines that such a second-tier service group should be removed when the statistics indicate the POP currently is not received a sufficient number of DNS requests for an FQDN that is being processed by a local second-tier service group.

When the process determines (at 835) that it should not add or remove a second-tier service group for one or more FQDNs to the POP, the process returns to 805. On the other hand, when the process determines (at 835) that it should add or remove a second-tier service group, it adds or removes (at 840) the second-tier service group to the POP, and then returns to 805. After adding or removing service machines from the second-tier service group, one or more internal routers of the POP are configured (e.g., through BGP or through a control plane) to update next-hop forwarding records to account for the added or removed service machines.

In addition to performing the process 800 of FIG. 8, some embodiments also perform scale-up/down operations for each second-tier security group at each POP. In some embodiments, this operation is performed by the controller cluster (not shown) at each POP. For this scale up/down operation, the controller cluster at each POP collects and analyzes statistics from the DNS servers (e.g., service machines) of each second-tier security group. Based on this analysis, the controller cluster adds additional DNS servers to each second-tier security group when the group's DNS servers are overloaded, and removes DNS from to each second-tier security group when the group's DNS servers are under utilized.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
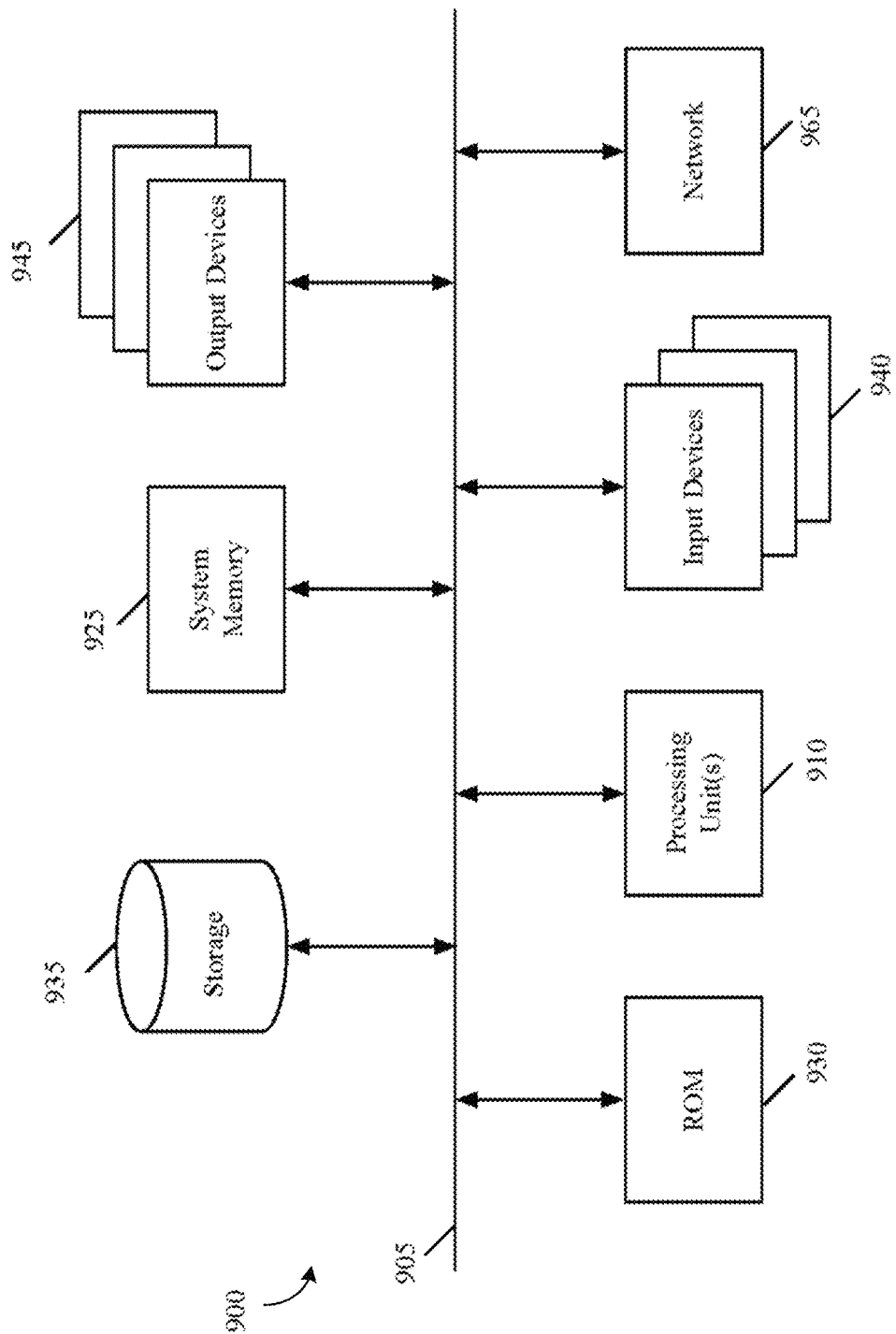
FIG. 9 conceptually illustrates a computer system with which some embodiments of the invention are implemented.

FIG. 9 conceptually illustrates a computer system 900 with which some embodiments of the invention are implemented. The computer system 900 can be used to implement any of the above-described computers and servers. As such, it can be used to execute any of the above described processes. This computer system includes various types of non-transitory machine readable media and interfaces for various other types of machine readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the computer system. The permanent storage device 935, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the computer system. The input devices 940 include alphanumeric keyboards and pointing devices (also called "cursor control devices"). The output devices 945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples computer system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of processing DNS (Domain Name System) requests, the method comprising:
deploying first and second tiers of service machines, with the second-tier of service machines comprising a plurality of second-tier groups of service machines;
configuring each second-tier group of service machines to resolve DNS requests for a different set of domain names than other second-tier groups; and
configuring the service machines in the first-tier to identify a second-tier group responsible for a first DNS request for a first domain name, and to forward the first DNS request to the second-tier group identified for the first DNS request;
wherein the first-tier service machines forward the first DNS request to the identified second-tier group by addressing the first DNS request to a first virtual Internet Protocol (VIP) address of the identified second-tier group; and
wherein the first and second tier service machines are part of an internal network, each VIP address of each second-tier group is a private VIP address defined within the internal network and is not directly accessible to machines operating in an external network separate from the internal network.

2. The method of claim 1, wherein each DNS request is received at each first-tier service machine addressed to a first virtual IP (VIP) address of a first-tier group that is different than all VIP addresses associated with all second-tier groups.

3. The method of claim 2, wherein the first VIP address is an anycast VIP address.

4. The method of claim 3, wherein the first and second tier service machines are part of an internal network, the method comprising advertising the anycast VIP address to an external network.

5. The method of claim 4, wherein the internal network is a local area network.

6. The method of claim 4, wherein the internal network is a wide area network.

7. The method of claim 2, wherein
the first VIP address is a public VIP address directly accessible to machines in the external network separate from the internal network.

8. The method of claim 7, wherein the first VIP is advertised to external network by a set of one or more gateway routers of the internal network, the method further comprising configuring the gateway router set to select, for each DNS request that is addressed to the first VIP address, a first-tier service machine and to forward the DNS request to the first-tier service machine selected for the DNS request.

9. The method of claim 8, wherein configuring the gateway router set comprises configuring the gateway router set to perform equal cost multi-path (ECMP) to select the first-tier service machine for each DNS request.

10. The method of claim 1, wherein the first-tier service machines include only one group of service machines each of which is configured to similarly identify the second-tier group responsible for each DNS request.

11. The method of claim 10, wherein each of two or more second-tier groups comprises a plurality of service machines.

12. The method of claim 1, wherein at least two different second-tier service groups process DNS requests for at least two different fully qualified domain names (FQDNs) that are part of a same domain, and at least two different second-tier service groups process DNS requests for at least two different FQDNs that are part of different domains.

13. The method of claim 1, wherein each second-tier service machine group processes DNS requests for a different subset of domain names, and hence is a smaller failure domain for only a subset of domain names that it processes.

14. The method of claim 1, wherein each second-tier service machine group provides a virtual DNS service that processes the DNS requests for a subset of domain names, and that is addressable through a different virtual IP (Internet Protocol) address than the other second-tier service machine groups.

15. The method of claim 1, wherein each second-tier service machine group processes DNS requests for a different subset of domain names, and uses an active/active layer 3 scaleout with border gateway protocol (BGP).

16. The method of claim 15, wherein the first-tier service machine group processes the DNS requests for all subsets of domain names processed by all second-tier service machine groups, and uses an active/active L3 scaleout with BGP.

17. A non-transitory machine readable medium storing a program which when executed by at least one processing unit processes DNS (Domain Name System) requests, the program comprising sets of instructions for:
deploying first and second tiers of service machines, with the second-tier of service machines comprising a plurality of second-tier groups of service machines;
configuring each second-tier group of service machines to resolve DNS requests for a different set of domain names than other second-tier groups; and
configuring the service machines in the first-tier to identify a second-tier group responsible for a first DNS request for a first domain name, and to forward the first DNS request to the second-tier group identified for the first DNS request;
wherein the first-tier service machines forward the first DNS request to the identified second-tier group by addressing the first DNS request to a first virtual Internet Protocol (VIP) address address of the identified second-tier group; and
wherein the first and second tier service machines are part of an internal network, each VIP address of each second-tier group is a private VIP address defined within the internal network and is not directly accessible to machines operating in an external network separate from the internal network.

18. The non-transitory machine readable medium of claim 17, wherein the first DNS request is received at a first-tier service machine addressed to a first virtual IP (VIP) address of a first-tier group that is different than all VIP addresses associated with all second-tier groups.

* * * * *